Figure 1:
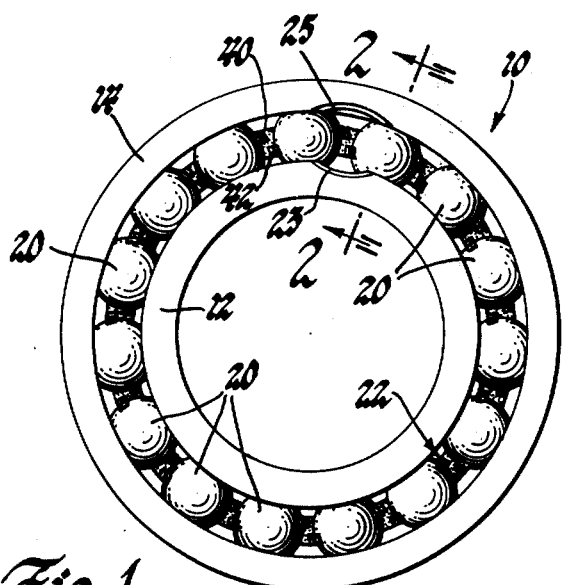

United States Patent [19]
Hooper

[11] 4,169,636
[45] Oct. 2, 1979

[54] BALL BEARING RETAINER

[75] Inventor: Robert E. Hooper, Huron, Ohio

[73] Assignee: General Motors Corporation, Detroit, Mich.

[21] Appl. No.: 817,206

[22] Filed: Jul. 20, 1977

Related U.S. Application Data

[63] Continuation of Ser. No. 713,443, Aug. 11, 1976, abandoned.

[51] Int. Cl.² .................................... F16C 19/20
[52] U.S. Cl. ........................................... 308/201
[58] Field of Search ............... 308/201, 193, 188, 235; 29/148.4 C, 148.4 R

[56] References Cited
U.S. PATENT DOCUMENTS 3,157,443  11/1964  Draudt .................................. 308/201
4,019,790  4/1977  Earsley et al. ........................ 308/201

FOREIGN PATENT DOCUMENTS 2406312  8/1975  Fed. Rep. of Germany ........... 308/201

Primary Examiner—Charles E. Frankfort
Attorney, Agent, or Firm—F. J. Fodale

[57] ABSTRACT

A loading groove ball bearing has a ball retainer of unitary mold plastic construction. The ball bearing retainer comprises an end ring having a plurality of axial fingers which cooperatively form a plurality of open ended ball pockets. Projections comprising oppositely oriented radially inner and outer sections extending from the free end face of each finger retain the bearing balls in the ball pockets.

8 Claims, 8 Drawing Figures

BALL BEARING RETAINER

This a continuation of application Ser. No. 713,443, filed on Aug 11, 1976 now abandoned.

This invention relates generally to a ball bearing retainer and more specifically to a ball bearing retainer of unitary molded plastic construction characterized by a single end ring having axially extending fingers for forming open ended ball pockets. Such an arrangement is generally known from the U.S. Pat. No. 3,157,443 issued to Herbert T. Draudt on Nov. 17, 1964 for a "Bearing Retainer." In the Draudt retainer the balls are retained in the ball pockets by a pair of yieldable dividers at the end of each of the axial fingers forming the open ended ball pockets. Each of the dividers extend for the full radial depth of the ball pocket. As the number of a ball complement is increased for increased bearing load capacity the circumferential space available between the balls is diminished. Consequently, ball bearing retainers for high capacity bearings must utilize means for retaining the balls in the ball pockets having small space requirements. Means such as the full radial dividers shown in the Draudt patent are not suitable because the dividers require more space than is available for adequate retention. One proposed solution eliminates one of the pair of dividers at the end of each finger. This solution, however, results in the retention of only every other ball.

Another shortcoming of the Draudt retainer is that the relatively thick section of the ball pockets limit its use to the angular contact type ball bearings shown in the patent.

The object of this invention is to provide an improved ball bearing retainer of unitary plastic construction which while retaining every ball overcomes one or more of the above noted shortcomings of the retainer disclosed in the Draudt patent.

Another object of this invention is to provide an improved ball bearing retainer for high capacity radial bearings which retains every ball in the ball complement.

Another object of this invention is to provide an improved ball bearing retainer suitable for use with high capacity loading groove type radial ball bearings.

Figure 4:
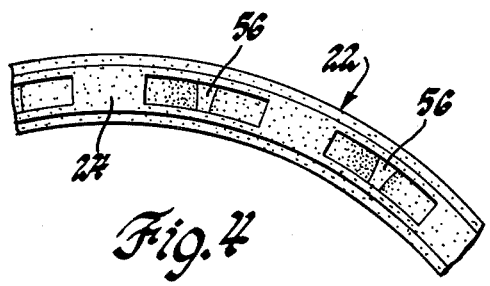
Figure 5:
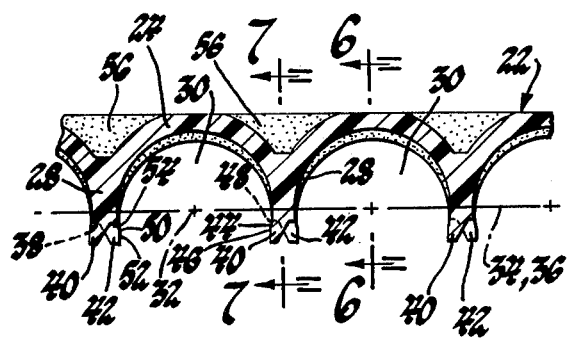

The exact nature of this invention as well as other objects and advantages thereof will be readily apparent from consideration of the following specification relating to the annexed drawing in which:

FIG. 1 is a front view of a loading groove type radial ball bearing having a ball bearing retainer of unitary plastic construction in accordance with this invention, FIG. 2 is a section taken substantially along the line 2—2 of FIG. 1, FIG. 3 is a view corresponding to a portion of FIG. 1 enlarged to illustrate details of the retainer, FIG. 4 is a rear view of the retainer shown in front view FIGS. 1 and 3, FIG. 5 is a developed view of the retainer taken substantially along the line 5—5 of FIG. 3 looking in the direction of the arrows, FIG. 6 is a section taken substantially along the line 6—6 of FIG. 5 looking in the direction of the arrows, FIG. 7 is a section taken along the line 7—7 of FIG. 5 looking in the direction of the arrows, and FIG. 8 is a perspective view of the retainer.

Referring now to the drawing there is illustrated in FIGS. 1 and 2 a radial ball bearing 10 comprising inner and outer relatively rotatable races 12 and 14. The races 12 and 14 have full groove raceways 16 and 18 respectively in which run a complement of balls 20 maintained in spaced circumferential relationship by a ball bearing retainer 22 of unitary plastic construction.

The radial ball bearing 10 is a high capacity bearing which utilizes a loading groove comprising cutouts 23 and 25 through the shoulders on one side of the raceways 16 and 18 respectively. The radial ball bearing 10 is assembled by passing the required number of balls 20 through the loading groove formed by the aligned cutouts 23 and 25 into the raceways 16 and 18 one at a time. Preferably the loading groove is tapered and slightly undersized at the juncture with raceways 16 and 18 requiring a snap insertion of the balls 20. After the required number of balls 20 is disposed in the raceways 16 and 18, the balls 20 are equally circumferentially spaced and the retainer 22 is axially assembled to the bearing 10 by inserting it into the annular space between shoulders on the right hand side of the races 12 and 14 as viewed in FIG. 2. During assembly the balls 20 are snapped past restricted openings into open end ball pockets of the retainer 22.

Focussing now on FIGS. 3 through 8, the ball bearing retainer 22 is a unitary molded plastic structure; a suitable material being a fiberglass filled nylon or the like. The retainer 22 has an end ring 24 normal to a concentric axis 26 and a plurality of axial fingers 28 which extend from the end ring 24 in cantilever fashion. The end ring 24 and axial fingers 28 cooperatively form a plurality of ball pockets 30 corresponding in number to the fingers 28. The ball pockets 30 are part shperical having centers 32 which lie in an imaginary pitch circle 34 which is centered from the axis 26 and substantially bisects the ball pockets 30 in the radial direction. In the axial direction, the pitch circle 34 and pocket centers 32 are also located in what may be termed the medial plane 36 of the retainer 22. The pockets 30 are designed for a running fit with the bearing balls 20 and consequently the free end faces 38 of the fingers 28 may be located slightly beyond the medial plane 36 of the retainer. This slight extension, however, does not provide any significant retention for the balls 20 due to the running fit of the balls in the pockets 30. The retention of the balls 20 in the pockets 30 is provided by generally axial integral projections extending from the free end faces 38 of each finger 28. The integral projection on each finger 28 consists of an outer section 40 which is located exclusively outwardly of the pitch circle 34 and an inner section 42 which is located exclusively inwardly of the pitch circle 34. This arrangement permits the oppositely oriented sections to have bases at the finger free end faces 38 which overlap in the circumferential direction as best illustrated in FIG. 7 which is a radial section through the retainer 22 intersecting the outer and inner sections 40 and 42 at the end of one of the fingers 28. The outer section 40 extends axially and circumferentially in the counterclockwise direction and thus restricts the opening for the ball pocket to the left of its associated finger as viewed in FIG. 3. On the other hand the inner section 42 extends axially and circumferentially in the clockwise direction and thus restricts the opening for the ball pocket to the right of its associated finger as viewed in FIG. 3. Each of the outer sections 40 have a part spherical surface 44 which is a coincidental extension of, that is, has the same center as the part spherical ball pocket to the left of its associated finger and has an outer retention surface 46 which is spaced circumferentially from the nearest edge 48 of the finger end in the counterclockwise direction. Each inner section 42 on the other hand has a part spherical surface 50 which is a coincidental extension of the part spherical ball pocket to the right of its associated finger and an inner retention surface 52 which is spaced circumferentially from the nearest edge 54 of the finger end in the clockwise direction. The distance between each outer retention surface and an inner retention surface 52 on the opposite side of a ball pocket 30 is less than the diameter of the ball pocket 30 and the ball 20 to be retained therein as best illustrated in FIGS. 3 and 5. The sections 40 and 42 while relatively stiff are nevertheless sufficiently resilient to elastically deform and permit the balls 20 to snap past the restricted openings for the ball pockets 30 formed by the retention surfaces 42 and 52. Thus each of the balls 20 are retained in the individual ball pockets 30 by an inner section 42 on one finger and a diametrically opposed outer section 40 on the next adjacent finger. This retention arrangement permits all of the balls to be retained with a minimum of spacing available between the balls.

The end ring 24 may have cavities 56 which hollow the thicker portions of the fingers 28. The cavities 56 same material, reduce weight and facilitate molding by tending to make the thickness uniform throughout the retainer 22.

I wish it to be understood that I do not desire to be limited to the exact details of construction shown and described, for obvious modifications will occur to a person skilled in the art.

What is claimd is:

1. A ball bearing retainer comprising:
   a unitary molded plastic structure having an end ring concentric to an axis, a plurality of axial fingers extending from said end ring in cantilever fashion which fingers in cooperation with said end ring form a like number of open ended ball pockets of a given diameter and projection means at the free end of each of said fingers for retaining balls in said ball pockets,
   said projection means comprising a radially outer section which extends axially and circumferentially in one direction to reduce the opening for the ball pocket to one side of its associated finger and a radially inner section which extends axially and circumferentially in an opposite direction to reduce the opening for the ball pocket to the opposite side of its associated finger, said radially inner section being radially spaced from and located exclusively radially inwardly of said radially outer section.

2. A ball bearing retainer comprising:
   a unitary molded plastic structure having an end ring concentric to an axis, a plurality of axial fingers extending from said end ring in cantilever fashion which fingers in cooperation with said end ring form a like number of open ended ball pockets of a given diameter having centers defining a medial plane of the retainer and projection means at the free end of each of said fingers across the medial plane from said end ring for retaining balls in said ball pockets,
   said projection means comprising a radially outer section located exclusively radially outwardly of an imaginary circle intersecting said fingers and having an outer retention surface spaced circumferentially from the free end of its associated finger in one circumferential direction to reduce the opening for the ball pocket to one side of its associated finger and a radially inner section located exclusively radially inwardly of said imaginary circle and having an inner retention surface spaced circumferentially from the free end of its associated finger in an opposite circumferential direction to reduce the opening for the ball pocket to the opposite side of its associated finger, and each said outer section having a base which in the circumferential direction overlaps a base of one of said inner sections and is radially spaced therefrom.

3. A ball bearing retainer comprising:
   a unitary molded plastic structure having an end ring concentric to an axis, a plurality of axial fingers extending from said end ring in cantilever fashion which fingers in cooperation with said end ring form a like number of open ended part spherical ball pockets of a given diameter having centers lying in a pitch circle defining a medial plane of the retainer, and projection means extending from a free end face of each of said fingers and at least partially disposed across the medial plane from said end ring for retaining bearing balls in said ball pockets,
   said projection means comprising a radially outer section which is located exclusively outwardly of said pitch circle and has a part spherical surface which is a coincidental extension of the part spherical ball pocket located at one side of its associated finger, and
   a radially inner section which is located exclusively radially inwardly of said pitch circle and has a part spherical surface which is a coincidental extension of the part spherical ball pocket located at an opposite side of its associated finger, each outer section having a retention surface which is spaced less than said given diameter from a retention surface of an inner section of an adjacent finger, and each said outer section having a base which is spaced from a base of one of said inner sections in the radial direction and overlaps said last mentioned base in the circumferential direction.

4. A ball separator for use in a ball bearing which includes an outer race, an inner race, and a plurality of balls coacting with said outer and inner races;
   said ball separator including an annular base, a plurality of annularly spaced fingers projecting generally axially from said base defining an interrupted annular rib adapted to be received between the outer and inner races of said ball bearing assembly,
   said rib fingers defining individual annularly spaced ball enclosing pockets;
   the improvement comprising each of said fingers comprising a pedestal for at least two independently flexing ears which are integral extensions of the pedestal;
   said at-least-two ears being radially separate and partially overlapping;
   and with the distal ends thereof projecting axially from the pedestal and into respective adjacent pockets,
   whereby each pocket is partially defined by reentrant ears of its associated fingers.

5. A ball separator as set forth in claim 4 further comprising said pockets being defined by spherical surfaces.

6. A ball separator as set forth in claim 4 further comprising said separator base defining a base plane perpendicular to the central axis of said ball separator;

said pedestals terminating in a common plane parallel to said base plane;

and said ear distal ends terminating in a common plane parallel to said base plane.

7. A ball separator as set forth in claim 4 further comprising said separator base and rib having common inner wall surfaces and common outer wall surfaces;

one of said ears for each pedestal having an outer wall surface common with said outer separator wall surface, and another of said ears having an inner wall surface common with said inner separator wall surface;

each finger including two of said ears;

said ears coincident with said outer wall surface projecting toward respective pockets in a common annular direction;

and said ears coincident with said inner wall surface projecting toward respective pockets in the opposite annular direction.

8. A ball separator as set forth in claim 4 further comprising said separator base and rib having common inner and outer concentric cylindrical walls, with said base defining a planar base surface perpendicular to said cylindrical walls;

said fingers projecting axially from said base with said pedestals terminating in a plane parallel to said base surface plane;

one of said ears for each pedestal having an outer wall common with said outer cylindrical wall, and another of said ears having an inner wall common with said inner cylindrical wall, and said ears having confronting walls generally concentric with said separator inner and outer walls.

* * * * *

UNITED STATES PATENT AND TRADEMARK OFFICE
CERTIFICATE OF CORRECTION

PATENT NO. : 4,169,636
DATED : October 2, 1979
INVENTOR(S) : Robert E. Hooper

It is certified that error appears in the above-identified patent and that said Letters Patent are hereby corrected as shown below:

Column 1, line 17, at the end of the line after "number of" insert -- balls in a --.

Column 2, line 32, "shperical" should read -- spherical --.

Column 3, line 25, "same" should read -- save --.

Column 3, line 32, claim introduction, "claimd" should read -- claimed --.

Signed and Sealed this

Fifteenth Day of January 1980

[SEAL]

Attest:

SIDNEY A. DIAMOND

Attesting Officer

Commissioner of Patents and Trademarks